(12) United States Patent
Kangarakis

(10) Patent No.: US 10,944,946 B2
(45) Date of Patent: Mar. 9, 2021

(54) METHOD FOR SETTING UP A PROJECTOR, PROJECTOR AND PASSENGER CABIN

(71) Applicant: DIEHL AEROSPACE GMBH, Ueberlingen (DE)

(72) Inventor: Nicolaus Kangarakis, Nuremberg (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 16/194,633

(22) Filed: Nov. 19, 2018

(65) Prior Publication Data
US 2019/0158792 A1    May 23, 2019

(30) Foreign Application Priority Data
Nov. 21, 2017  (DE) .......................... 102017010741.6

(51) Int. Cl.
*H04N 9/31* (2006.01)
*G03B 21/14* (2006.01)
*B64D 11/00* (2006.01)

(52) U.S. Cl.
CPC ....... *H04N 9/3185* (2013.01); *B64D 11/0015* (2013.01); *G03B 21/147* (2013.01); *H04N 9/3194* (2013.01); *G03B 2205/00* (2013.01)

(58) Field of Classification Search
CPC .. H04N 9/3185; H04N 9/3194; G03B 21/147; G03B 2205/0092; B64D 11/0015
See application file for complete search history.

(56) References Cited

U.S. PATENT DOCUMENTS 7,441,906 B1 * 10/2008 Wang ..................... G03B 21/14
348/745
8,246,173 B2    8/2012 Vogel
(Continued)

FOREIGN PATENT DOCUMENTS

DE        102007027420 B3    8/2008
DE        102007027421 A1    12/2008
DE        102009034629 A1    1/2011

*Primary Examiner* — Michelle M Iacoletti
*Assistant Examiner* — Danell L Owens
(74) *Attorney, Agent, or Firm* — Scully Scott Murphy and Presser

(57) ABSTRACT

A method for setting up a projector (10) for a passenger cabin (4) of an aeroplane (2), wherein the passenger cabin (4) comprises a projection surface (14) with a known configuration (G) and the projector (10) in the passenger cabin (4) is in a known relative position (RP) with respect to the projection surface (14) in a mounting position (M), geometrical data (16) relating to the configuration (G) and relative position (RP) are received by the projector (10), and predistortion data (22) are determined from the geometrical data (16) according to an imaging rule (18) in order to predistort the images (12) and represent them as rectified images (12") on the projection surface, and the projector (10) is set up by storing the predistortion data (22) in the projector (10).

A projector (10) contains an imaging rule (18) and an input (20) for geometrical data (16), and is configured to carry out the method according to the invention and, during operation when set up, to predistort images (12) with the aid of the predistortion data (22) and to project them.

A passenger cabin (4) having at least one projector (10) and at least one projection surface (14) has at least one of the projectors (10) according to the invention.

12 Claims, 2 Drawing Sheets

(56) References Cited

U.S. PATENT DOCUMENTS

| | | | | |
|---|---|---|---|---|
| 8,277,053 B2* | 10/2012 | Vogel | ................. | B64D 11/0015 |
| | | | | 345/647 |
| 8,322,863 B1* | 12/2012 | Cho | .................... | H04N 9/3185 |
| | | | | 353/70 |
| 2005/0041216 A1 | 2/2005 | Kobayashi | | |
| 2008/0204670 A1 | 8/2008 | Furui | | |
| 2011/0266392 A1* | 11/2011 | Goehlich | ........... | B64D 11/0015 |
| | | | | 244/118.6 |
| 2013/0222386 A1* | 8/2013 | Tannhauser | ............. | G06T 11/60 |
| | | | | 345/428 |
| 2015/0350617 A1* | 12/2015 | Chevassus | ........... | G01N 21/956 |
| | | | | 348/745 |
| 2016/0266392 A1* | 9/2016 | Arnold | ................. | G02B 21/025 |

\* cited by examiner

METHOD FOR SETTING UP A PROJECTOR, PROJECTOR AND PASSENGER CABIN

BACKGROUND OF THE INVENTION

The invention relates to a method for setting up a projector for a passenger cabin of an aeroplane, to a projector for the passenger cabin and to the passenger cabin.

DISCUSSION OF THE PRIOR ART

DE 10 2007 027 420 B3 discloses a projection method and a projection device for projecting an overall image onto the inner walls of an aircraft, in which respectively the boundary regions of a plurality of subimages of an overall image to be represented are adapted accordingly and subimages are predistorted so as to obtain in this way, even in the case of a complicated geometry of the projection surfaces, a large-area undistorted image representation in which the transition regions of subimages are perceptible at least only to a reduced extent. By a self-regulating projection method, which for example compares the projected image region with the overall image by pattern recognition, defective predistortions can be identified and correspondingly compensated for.

In practice, it is conventional to use a camera for corresponding pattern recognition. Adjustment of the predistortion of the projector is therefore carried out during regular operation thereof, or during the actual reproduction of image contents.

SUMMARY OF THE INVENTION

The present invention is directed to a method for setting up a projector for a passenger cabin of an aeroplane.

The passenger cabin comprises a projection surface with a known configuration. The projector can be fitted in the passenger cabin in a mounting position in which the projector is in a known relative position with respect to the projection surface in order to project images onto the projection surface.

According to the present invention, geometrical data are received by or in the projector, i.e. the projector receives these data. The geometrical data describe the known configuration and the known relative position. Predistortion data are determined in the projector from the geometrical data according to an imaging rule. The predistortion data are used to predistort the images before the projection to form predistorted images, in such a way that the predistorted images projected by the projector are represented in rectified form as rectified images on the projection surface, or can be observed as these rectified images by an observer. The projector is set up for rectified projection in the mounting position by storing the predistortion data in the projector.

A "position" in this case describes both the placement coordinates and the spatial orientation of objects. The imaging rule describes the mathematical relationships of how the image is projected onto the projection surface. A corresponding imaging rule is obtained in the conventional way, i.e. according to known (inverse) optical or geometrical imaging laws, inter alia of the geometrical optics. The predistortion data are, in particular, stored in the projector. "Rectification" in the present case means that the projected image has less distortions relative to the (original) image to be projected, then if it were projected without predistortion. In the best case, the projected image is represented undistorted on the projection surface.

The "setting up" of the projector describes a process which, in particular, is carried out only once before or after the projector is put into operation. The setting up may also be carried out before the mounting of the projector in the aeroplane, but in any event is independent of such actual mounting, or an actual mounting placement. What is crucial is only the planned or designed mounting placement (see below). The setting up is carried out particularly in a single step, and in particular not iteratively. The setting up is in particular concluded before the projector assumes its regular operation. In particular, the projector does not carry out any projection, i.e. reproduction of contents, during the setting up.

"Known" geometrical data or configuration or relative position are those which in particular are not determined by sensors, but are simply known beforehand for the intended arrangement of a projector and aeroplane. The data are, in particular, known before the projector is or has been installed at its intended mounting position in the aeroplane. The data are, in particular, known before the aeroplane has in fact been manufactured, or exists. The data are, in particular, theoretical or virtual planning data/design data of the aeroplane.

The invention offers the advantage that no intervention from the outside is needed for setting up the projector, i.e. for determining the predistortion data in the specific installation situation (given projection surface, given relative position of the projector with respect to the projection surface): the respective predistortion data for the specific installation situation are determined autonomously by the projector itself and are stored in the projector. External intervention by a human technician and/or a sensor system, in particular a camera system, evaluating the predistortion is obviated. In this sense, the method is an automatic method, or the projector is a projector which is automatically set up.

In one preferred embodiment, the projector is brought into the mounting position in the passenger cabin before the reception of the geometrical data. The setting up is thus carried out after the final mounting of the projector in the given installation situation, i.e. mounting position. The method therefore allows final mounting of a projector which has not yet been set up, and the subsequent automatic "self-setup" of the finally mounted projector. In particular, the setting up is concluded before the projector assumes its actual regular operation, in particular before the projector reproduces contents.

In one preferred embodiment, the imaging rule is selected in such a way that the images are predistorted to form predistorted images in such a way that the projected images are represented undistorted on the projection surface for an observer who is in a known relative position with respect to the projection surface. The setting up of the projector is therefore optimised for observers who are in a particular relative position with respect to the projection surface, and especially have a particular viewing angle onto the projection surface.

In one preferred embodiment, the imaging rule is selected in such a way that the images rectified in such a way that an (original) image which has a grid as its image content is projected as a corresponding grid (projected image) onto the projection surface. The projection of images is therefore carried out "faithfully" at least to the extent that at least the grid angles, the grid line width and the grid line length are preserved during the projection. Corresponding imaging properties are therefore also obtained for any other image content.

In one preferred embodiment, at least some of the geometrical data are received in the form of design data of the aeroplane and/or of the projector, in particular CAD data. In particular, all the geometrical data are received as design data. Corresponding design data are conventionally available for corresponding aeroplanes, and in particular are previously known before the start of the setting up. Such data are also informative enough that the predistortion data can be determined simply and accurately with the aid of the imaging rule.

In one preferred embodiment, a distortion rule for the (original) images to be projected to form predistorted images and/or a focal length of the projector are determined as predistortion data. According to the distortion rule, the (original) images are first distorted and only then projected by the projector. By adjustment of the focal length of the projector, sharp projection onto at least a part of the projection surface is ensured.

In one preferred embodiment, a geometry and/or an extent of the projection surface and/or a distance of the projection surface from the projector are received as geometrical data. The corresponding data are in particular coordinate data, orientation data, extent data, curvature data, shape data, in particular for a multiplicity of support points of the projection surface and/or of the projector. In particular, the aforementioned CAD data have corresponding features.

In one preferred embodiment, at least one distance of the projection surface from the projector and at least one curvature of the projection surface at least as part of the imaging rule is taken from the geometrical data or determined. A suitable predistortion may be determined particularly simply from corresponding data with the aid of a suitable imaging rule.

In one preferred embodiment, the method is carried out without the aid of a sensor, in particular without the aid of a camera. Compared to methods or arrangements with a sensor or camera, a significant simplification and a cost advantage are thus obtained.

In one preferred embodiment, at least one section of a ceiling of the passenger cabin is used as the projection surface. Projection onto ceilings of passenger cabins is particularly desirable, for which reason the method is particularly useful in this case.

In one preferred embodiment, the method is carried out at least once automatically when operating the projector. This is done in particular at the start of operation of the projection, for example after its mounting, replacement, maintenance, repair or after a change in the mounting position, etc. it is done in particular before the start of regular operation of the projection, in particular before the reproduction of contents during a flight, and in particular before the start of the reproduction of contents. The operation, or putting into operation, of the projector is therefore carried out without external intervention, in particular by a so-called "autostart" of the method when connecting the projector to a power supply and/or in the event of initial or new presence or existence of new or modified geometrical data.

The present invention is also directed to a projector for a passenger cabin of an aeroplane. The passenger cabin comprises a projection surface with a known configuration. The projector can be fitted in the passenger cabin in a mounting position in which the projector is in a known relative position with respect to the projection surface in order to project images onto the projection surface. The projector contains an imaging rule and an input for receiving geometrical data, which describe the known configuration and the known relative position. To this end, the projector is configured to carry out the method according to the invention, and, during operation when set up, to predistort images with the aid of the predistortion data and to project them. To this end, the projector contains in particular the conventional required components, for example a computation unit, a memory for the imaging rule and the predistortion data, etc.

The projector and at least some of its embodiments, as well as the respective advantages, have already been explained correspondingly in connection with the method according to the invention.

The present invention is further directed to a passenger cabin for an aeroplane. The passenger cabin contains at least one projector and at least one projection surface with a known configuration. The projector is fitted in the passenger cabin in a mounting position in which the projector is in a known relative position with respect to the projection surface in order to project images onto the projection surface as projected images. At least one of the projectors is a projector according to the invention.

The passenger cabin and at least some of its embodiments, as well as the respective advantages, have already been explained correspondingly in connection with the method according to the invention and the projector according to the invention.

The invention is based on the following discoveries, observations or considerations, and also comprises the following embodiments. The embodiments are in this case sometimes also referred to as "the invention" for simplicity. The embodiments may in this case also contain parts or combinations of the embodiments mentioned above, or may correspond thereto, and/or may optionally also include embodiments not yet mentioned.

The invention is based on the consideration that, for the case in which an image is projected onto a very flat curved surface, previous calculation of the distortion and focal length is necessary.

According to the invention, sensor-independent and in particular camera-independent determination of the focal length and distortion (predistortion data) is obtained. The method according to the invention and corresponding devices work without a camera. According to the invention, a sharp and uniform projection of an image onto the ceiling of an aeroplane cabin is obtained.

According to the invention, a projector (with a control unit)—in subsequent regular operation—projects an image onto the ceiling of an aeroplane cabin, i.e. it is intended to project such an image. Of the projector and the ceiling, the coordinates, orientations and extent are known and are stored in a file. The control unit (of the projector) reads the coordinates, orientations and extent of the projector and of the ceiling in from the file and calculates the optimal distortion and focal length therefrom. This is done in particular before the start of regular operation, or generally before reproduction of contents. That is to say: during subsequent regular operation, an (original image with the image content) grid to be reproduced appears to a passenger as a (represented, projected, actually reproduced) grid independently of the projector angle with respect to the ceiling.

According to the method, the surface onto which projection is to be carried out is read in (for example as a CAD file). From this, the curvature (of the projection surface) and the distances (projector from the projection surface) are calculated. With these data, the rectification (or predistortion) and the optimal focal length are determined.

By virtue of the invention, projected images are uniformly sharp even without a camera. Many previous methods require a camera for compensation.

BRIEF DESCRIPTION OF THE DRAWINGS

Other features, effects and advantages of the invention may be found in the following description of a preferred exemplary embodiment of the invention and the appended figures. In the latter, in a schematic outline diagram.

DETAILED DESCRIPTION OF THE INVENTION

Figure 1:
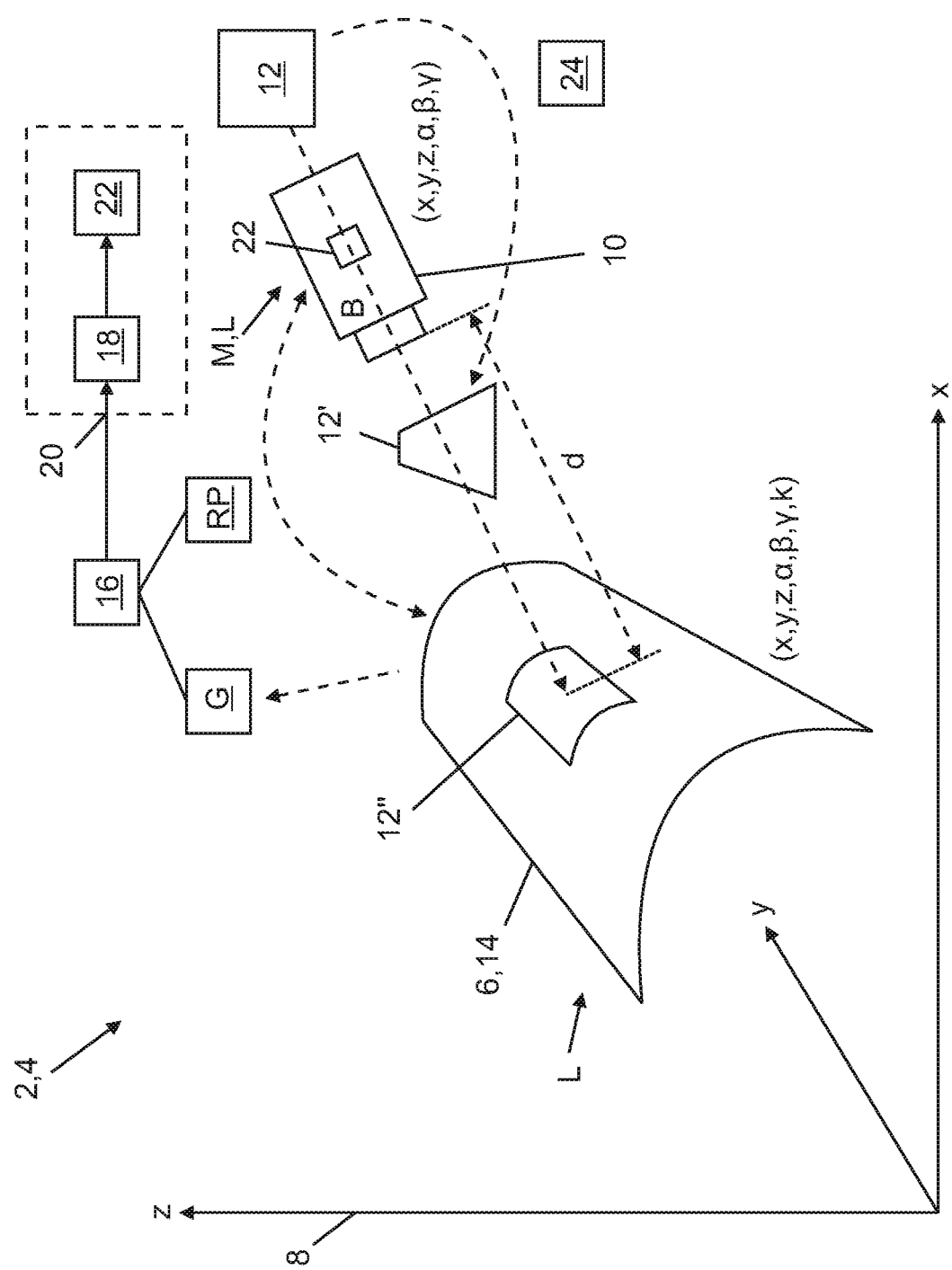
FIG. 1 shows a detail of a passenger cabin of an aeroplane.

FIG. 1 shows a detail of an aeroplane 2, or of its passenger cabin 4, in the form of a ceiling section 6 of the ceiling of the passenger cabin 4, the ceiling section 6 being formed by a cladding panel. The passenger cabin 2 furthermore contains a projector 10. The projector 10 is fitted in the passenger cabin 4 in a mounting position M. During operation, the projector (10) projects (indicated by arrow) an (original) image 12 as an image 12" (picture, representation, reproduction) onto the ceiling section 6, which constitutes a projection surface 14 for the image 12, or the projector 10.

In a coordinate system 8, both a position (x,y,z coordinates) and orientation ($\alpha,\beta,\gamma$ rotation angle about the x,y,z axes) and the curvature (k) of the projection surface 14 and a position (x,y,z) and orientation ($\alpha,\beta,\gamma$) of the projector 10 are known. A configuration G of the projection surface 14 is therefore also known (indicated by an arrow). The position and orientation together respectively from a position L of the projection surface 14 and projector 10 in the coordinate system 8. A relative position of RP (indicated by a double arrow) of the projector 10 with respect to the projection surface 14 is therefore also known. The configuration G and the relative position RP together form geometrical data 16, or the geometrical data 16 describe the configuration G and the relative position RP. The geometrical data 16 therefore describe both the geometry (curvature) and the extent (dimensions) of the projection surface 14 and the distance d of the projection surface 14 from the projector 10.

For illustration, the projector 10 is again represented in FIG. 1 by dashes. The projector 10 contains an imaging rule 18, as well as an input 20. The input 20 is used to receive the geometrical data 16.

The projector 10 is configured to carry out the following method:

The method is used to set up the projector 10 for the passenger cabin 4 of the aeroplane 2. The geometrical data 16 are received by the projector 10. In the projector 10, predistortion data 22 are determined from the geometrical data 16 according to the imaging rule 18. The predistortion data 22 are used to predispose the image 12 into a predistorted image 12' before its projection by the projector 10. In this case, the predistortion is configured in such a way that a rectified image 12" is obtained by the predistorted image 12' arriving on the projection surface 14. The projector 10 is then configured to rectify the projection in the mounting position, in which the predistortion data 22 are stored in the projector 10.

As part of the imaging rule 18, the geometrical data 16 of the distance d as well as the curvature k of the projection surface 14 are taken and processed further in the imaging rule 18.

The described method is carried out without the aid of a camera. By an autostart circuit (not described in detail), the method is carried out in the projector 10 as soon as it is supplied with an operating voltage. This ensures that the projector always takes into account the given installation situation during its projection.

The projector 10 is also configured, during operation, to predistort the images 12 with the aid of the predistortion data 22 to form an image 12' and project them in the direction of the projection surface 14. The predistortion data 22 are therefore symbolically represented in the projector 10 by means of the arrow indicating the imaging.

The projector 10 is thus fitted in the passenger cabin 4 in the mounting position M before the reception of the geometrical data 16. The geometrical data 16 are in this case in the form of CAD data, and are therefore also received as such by the projector 10. The CAD data were in this case already known before the start of the setting up, namely at the time of the design of the aeroplane, or the establishment of its geometry. The data have to this end been stored before the start of the setting up. During the setting up, the geometrical data are then received by the projector 10. As predistortion data 22, a predistortion rule 24 is determined, according to which the image 12 is distorted to form the distorted image 12'. As predistortion data 22, a focal length B for the projector 10 is furthermore determined. According to this focal length B, sharp image representation of the image 12" is carried out on the projection surface 14 with the given distance d between the projector 10 and the projection surface 14.

FIG. 2 again represents by way of example the situation in the aeroplane 2 when an observer 26 is in a particular relative position RB with respect to the projection surface 14. The observer 26 is intended to be able to observe the projected image 12" undistorted, i.e. as the (original) image 12. For this case, the imaging rule 18 is correspondingly configured so that the predistortion to form the image 12' is carried out in such a way as to achieve this effect in the projected image 12".

Figure 2:
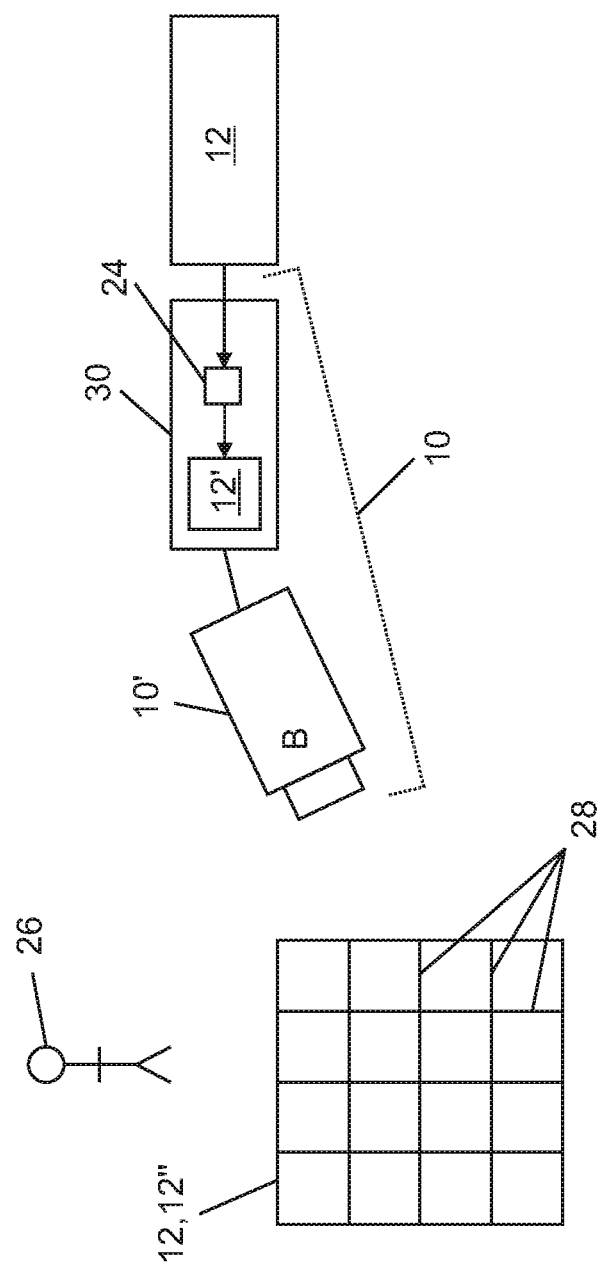
FIG. 2 shows a symbolic representation of a projector and projected images.

FIG. 2 also illustrates the procedure of selecting the imaging rule 18 in such a way that an image 12 which as a grid 28 as image content is also projected onto the projection surface 14 as a corresponding grid, i.e. the grid 28 appears true-to-original to the image 12 in the image 12".

FIG. 2 symbolically shows a computer 30 which in this case is connected upstream of an actual projector 10', so that the two together form the projector 10 in the sense of the present invention. In the computer 30, the predistortion of the image 12 to form the image 12' is carried out with the aid of the predistortion data 22. The focal length B is then adjusted at the actual projector 10'.

LIST OF REFERENCES 2 aeroplane
4 passenger cabin
6 ceiling section
8 coordinate system
10 projector
12 image
14 projection surface
16 geometrical data
18 imaging rule
20 input
22 predistortion data
24 distortion rule
26 observer
28 grid
30 computer
M mounting position L position
RP relative position of projector
RB relative position of observer
G configuration
B focal length
d distance
x,y,z coordinates
α,β,γ rotation angle
k curvature

What is claimed is:

1. A method for setting up a projector for a passenger cabin of an aeroplane, wherein the passenger cabin comprises a projection surface with a known actual configuration, and wherein the projector can be fitted in the passenger cabin in a mounting position in which the projector is in a known actual relative position with respect to the projection surface in order to project images onto the projection surface, wherein
   geometrical data which describe the known actual configuration and the known actual relative position are received by the projector, wherein
   predistortion data are determined and calculated in the projector from the geometrical data according to an imaging rule, the predistortion data being used to predistort the images before the projection to form predistorted images, in such a way that the predistorted images projected by the projector are represented as rectified images on the projection surface,
   the projector is set up for rectified projection in the mounting position by storing the predistortion data in the projector, and
   wherein the method is carried out without the aid of a sensor.

2. The method according to claim 1, wherein the projector is brought into the mounting position in the passenger cabin before the reception of the geometrical data.

3. The method according to claim 1, wherein the imaging rule is selected in such a way that the images are predistorted to form images in such a way that the projected images are represented undistorted on the projection surface for an observer who is in a known actual relative position with respect to the projection surface.

4. The method according to claim 1, wherein the imaging rule is selected in such a way that the images are predistorted to form images in such a way that an image which has a grid as its image content is projected as a corresponding grid as an image onto the projection surface.

5. The method according to claim 1, wherein at least some of the geometrical data are received in the form of design data.

6. The method according to claim 1, wherein a distortion rule for the images to be projected to form distorted images and/or a focal length of the projector are determined as predistortion data.

7. The method according to claim 1, wherein a geometry and/or an extent of the projection surface and/or a distance of the projection surface from the projector are received as geometrical data.

8. The method according to claim 1, wherein at least one distance of the projection surface from the projector and at least one curvature of the projection surface at least as part of the imaging rule is taken from the geometrical data or determined.

9. The method according to claim 1, wherein at least one section of a ceiling of the passenger cabin is used as the projection surface.

10. The method according to claim 1, wherein the method is carried out at least once automatically when operating the projector.

11. A projector for a passenger cabin of an aeroplane, wherein the passenger cabin comprises a projection surface with a known actual configuration, and wherein the projector can be fitted in the passenger cabin in a mounting position in which the projector is in a known actual relative position with respect to the projection surface in order to project images onto the projection surface as projected images, wherein
   the projector contains an imaging rule and
   an input for receiving geometrical data, which describe the known actual configuration and the known relative position, and is configured
   to carry out a method according to claim 1, and
   during operation when set up, to predistort images with the aid of the predistortion data to form predistorted images and to project them as projected images.

12. A passenger cabin for an aeroplane, having at least one projector, wherein the passenger cabin comprises at least one projection surface with a known actual configuration, and wherein the projector is fitted in the passenger cabin in a mounting position in which the projector is in a known actual relative position with respect to the projection surface in order to project images onto the projection surface as projected images, wherein at least one of the projectors is a projector according to claim 11.

* * * * *